United States Patent [19]
Levy

[11] Patent Number: 5,489,055
[45] Date of Patent: Feb. 6, 1996

[54] CUP HOLDER FOR AUTOMOBILE

[76] Inventor: Dror Levy, 8720 Sherman Cir. N., Apt. #202, Miramar, Fla. 33025

[21] Appl. No.: 267,230

[22] Filed: Jul. 5, 1994

[51] Int. Cl.$^6$ ..................................................... B60R 7/00
[52] U.S. Cl. .................. 224/544; 224/556; 224/553; 224/564; 224/926; 248/311.2
[58] Field of Search ..................... 224/926, 544, 224/553, 556, 564; 297/188.14, 188.18; 248/220.3, 224.4, 231.9, 211.2, 312

[56] References Cited

U.S. PATENT DOCUMENTS

| | | | |
|---|---|---|---|
| 2,926,879 | 3/1960 | Dietrich | 224/926 |
| 3,842,981 | 10/1974 | Lambert | 224/926 |
| 4,191,350 | 3/1980 | Ormond | 248/311.2 |
| 4,262,962 | 4/1981 | Yust | 297/188.18 |
| 4,819,843 | 4/1989 | Nakayama | 224/926 |
| 4,865,237 | 9/1989 | Allen | 224/926 |
| 4,878,642 | 11/1989 | Kirby, Jr. | 248/311.2 |
| 5,044,577 | 9/1991 | Spearman . | |
| 5,048,733 | 9/1991 | Nagy | 224/926 |
| 5,086,958 | 2/1992 | Nagy . | |
| 5,165,639 | 11/1992 | Knuppe . | |
| 5,165,646 | 11/1992 | Gewecke . | |
| 5,190,259 | 3/1993 | Okazaki . | |
| 5,191,679 | 3/1993 | Harper . | |
| 5,395,085 | 3/1995 | Mann | 297/188.14 |

FOREIGN PATENT DOCUMENTS

| | | |
|---|---|---|
| 3327238 | 2/1985 | Germany . |
| 75602 | 9/1949 | Norway . |
| 2129671 | 10/1982 | United Kingdom . |
| 2223931 | 10/1988 | United Kingdom . |

*Primary Examiner*—Linda J. Sholl
*Attorney, Agent, or Firm*—Richard C. Litman

[57] ABSTRACT

A cup holder for use in various locations within the interior of a automobile includes a planar member, and a gimbal mechanism attached to the planar member which includes a C-shaped support member, and a cup retaining member. The planar member may be inserted and secured in various compartments, including the ashtray and glove compartment. The C-shaped member is pivotally mounted to the planar member, and the cup retaining member is pivotally mounted between the arms of the C-shaped member. Once mounted in the automobile, a container may be secured in the up right position within the automobile. An alternative embodiment includes a window attaching portion which allows the device to mounted from an automobile passenger window. Another alternative embodiment includes a cylindrical support base which allows the cup holder to be mounted in a cigarette lighter socket. Another embodiment includes a cup with pins attached for pivotally mounting the cup on the C-shaped member.

8 Claims, 4 Drawing Sheets

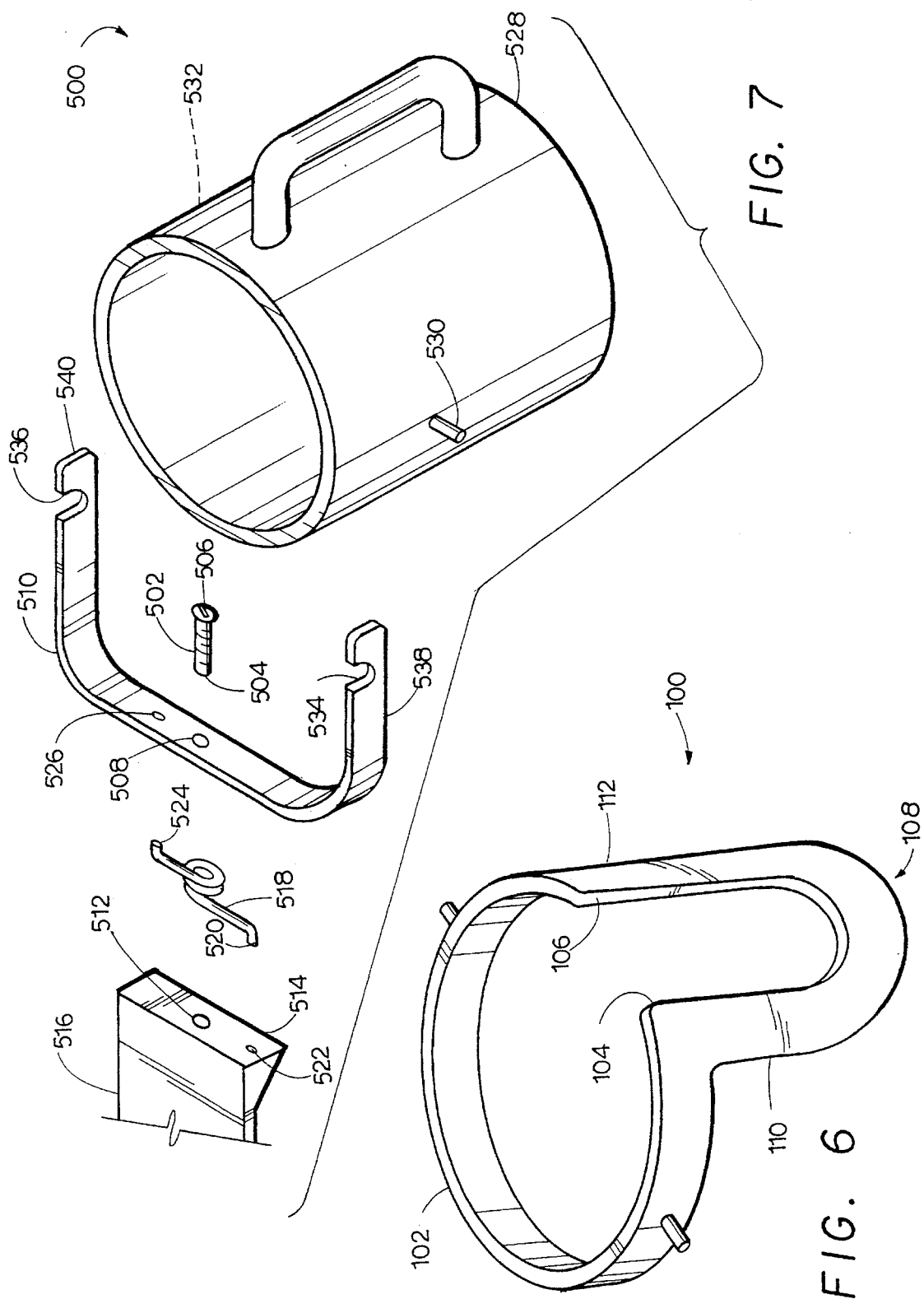

CUP HOLDER FOR AUTOMOBILE

BACKGROUND OF THE INVENTION

1. Field of the Invention

The present invention relates to a cup holding apparatus for use inside an automobile which may be secured at a convenient location within the interior of the automobile.

2. Description of the Prior Art

Cup holders for the convenience of drivers of automobiles are known in the prior art which enhance the ability of the driver to access beverages while driving. Many of the prior art devices, however are typically limited to placement in very specific locations and failed to provide a gimbal mechanism which would reduce fluid spillage due to the movement of the automobile.

U.S. Pat. No. 5,044,577, issued to John W. Spearman on Sep. 3, 1991, discloses an Automobile Accessory Holding Device which includes an anchor, and a holder body. The anchor includes a wedge-like element adjustably connected to the holder body and adapted for insertion into the ashtray socket of a vehicle. Unlike the present invention, the invention of the '577 patent is relatively bulky and can only be used when the ashtray has been removed.

U.S. Pat. No. 5,086,958, issued to Giselle Nagy on Feb. 11, 1992, discloses a Vehicular Accessory Mounting Organization which includes a cylindrical base dimensioned for insertion into a cigarette lighter socket, a "Z" shaped forward leg attached to the base, and an articular linkage to permit the positioning and support of various vehicular accessory items within an automotive environment. The invention of the 958' patent requires that a special flange be attached to a cup used with the invention and fails to provide a gimbal mechanism to prevent spillage.

U.S. Pat. No. 5,190,259, issued to Hidetsugu Okazaki on Mar. 2, 1993, discloses a Cup Holding Apparatus which includes a cup holder, a containing portion for containing therein the cup holder. A hinged lid provided on a base portion constitutes the containing portion such that the cup holder can be contained in such a manner as to be held between the lid and the base portion when the lid is closed.

U.S. Pat. No. 5,191,679, issued to James B. Harper on Mar. 9, 1993, discloses a Displaceable Hinge for use in a carrier for a beverage container. The device of the '679 patent allows the distance between a beverage container holder and its base to be adjusted, allowing the holder to accommodate various sizes of beverage containers.

U.K. Patent Application No. 2,223,931 A, filed Oct. 18, 1988, discloses a Gimballed Drink Holder which includes a mounting plate fastened to a vertical surface, a pin attached to the plate, a C-shaped arm mounted to rotate on the pin. A basket is pivotally supported by the C-shaped arm and dimensioned to accept a cup or mug.

Other patent documents pertaining to cup holders include; U.S. Pat. No. 5,165,639, which issued to Michael Knuppe on Nov. 24, 1992 and discloses a Vessel Support; U.S. Pat. No. 5,165,646, which issued to Danny F. Gewecke on Nov. 24, 1992 and discloses a Auto Dashboard Drink Conditioner; U.K. Patent Application 2,129,671 A, which was filed Oct. 28, 1982 and discloses a Holder for Storing Drinking Vessels and Other Receptacles; Norwegian Patent Document No. 75,602 dated Sep. 19, 1949; and German Patent Document DE 3327-238-A, dated Jul. 28, 1983.

None of the above inventions and patents, taken either singly or in combination, is seen to describe the instant invention as claimed.

SUMMARY OF THE INVENTION

The present invention provides a cup holder which may be used in various locations within the interior of an automobile. The cup holder of the present invention includes a planar member, and a gimbal mechanism attached to the planar member. The gimbal mechanism includes a C-shaped support member and a cup retaining member. The planar member may be inserted and secured in various compartments, including the ashtray and glove compartment. The C-shaped member is pivotally mounted to the planar member, and the cup retaining member is pivotally mounted between the arms of the C-shaped member. Once mounted in the automobile, a container may be secured in the upright position within the automobile. The straight forward design allows for the convenient relocation of the device within the car to suit the need of the driver or passenger. In addition, the rotatable nature of both the C-shaped member and the cup retaining member allow a container to pivot in reaction to movement of the automobile and maintain a horizontal position to minimize spillage.

Accordingly, it is a principal object of the invention to provide a versatile cup holder which may be used in various locations within an automobile.

It is another object of the invention to provide a cup holder which will remain securely mounted within the automobile and minimize spillage.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 is a perspective view of an another configuration of the cup retaining ring member of the cup holder.

FIG. 7 is an exploded perspective view of a fifth embodiment of the present invention.

Similar reference characters denote corresponding features consistently throughout the attached drawings.

DETAILED DESCRIPTION OF THE PREFERRED EMBODIMENTS

Various embodying examples of this invention will now be explained with reference to the accompanying drawings.

Figure 1:
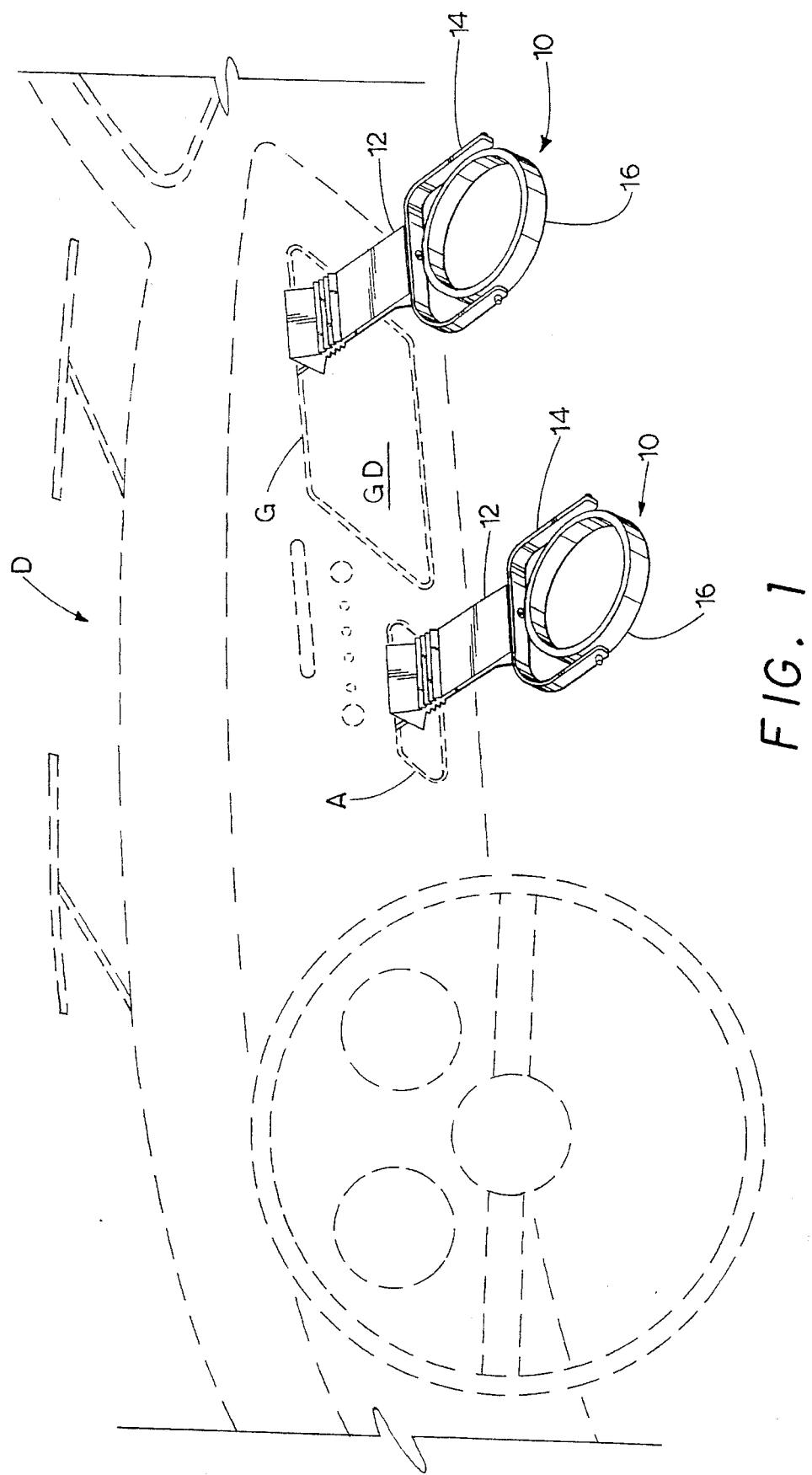
FIG. 1 is an environmental perspective view showing a first embodiment of the cup holder of the present invention secured within the glove compartment and ashtray of an automobile.

Referring to FIG. 1, the cup holder 10 of the present invention is shown mounted in both the closed glove compartment G and closed ashtray A of a vehicular dashboard D.

Figures 2, 3:
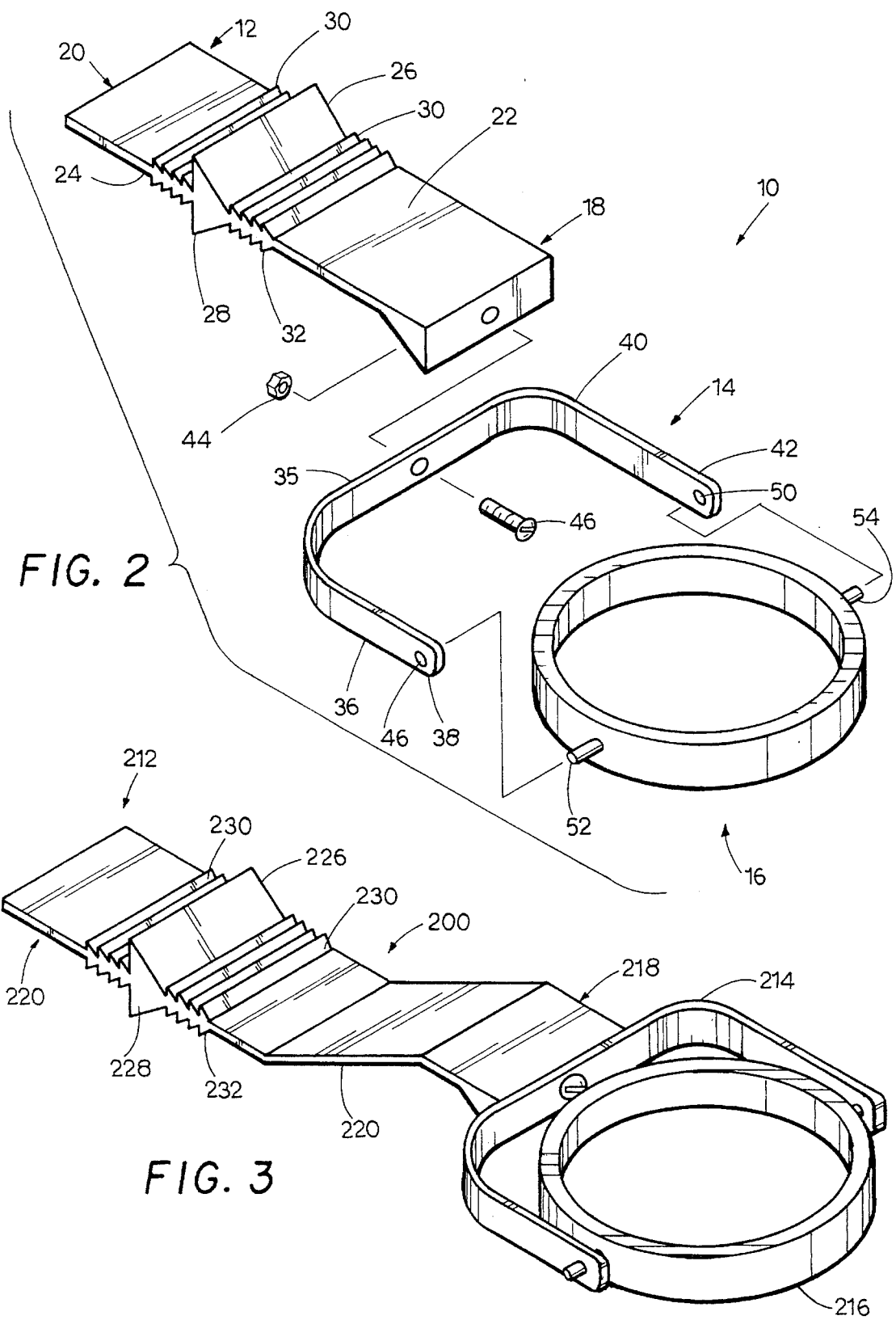
FIG. 2 is an exploded perspective view of the first embodiment of the cup holder.
FIG. 3 is a perspective view of a second embodiment of the present invention which includes an offset portion.

As best shown in FIG. 2, the cup holder 10 of the first embodiment of the present invention includes an elongated planar member 12, a C-shaped support member 14, and a cup retaining ring 16.

The elongated planar member 12 includes a planar member first end 18, a planar member second end 20, a top surface 22, a bottom surface 24, a triangular shaped stop ridge 26 extending from the top surface 22, a triangular shaped bottom stop ridge 28 directly below the top stop ridge 26, a plurality of triangular shaped top gripping ridges 30, and a plurality of triangular shaped bottom gripping ridges 32.

The resilient C-shaped support member 14 has a middle section 35, a first arm 36 extending from one end of the middle section 35 to terminate in a first arm end 38, and a second arm 40 extending from a second end of the middle section 35 to terminate in a second arm end 42. The middle section 35 is rotatably connected to the planar member first end 18 using a nut 44 and bolt 46 such that the longitudinal axis of the middle section 35 is substantially perpendicular to the longitudinal axis of the elongated planar member 12. The first arm end 38 and second arm end 42 include apertures 48,50. These apertures 48,50 are used in mounting the cup retaining ring 16.

The cup retaining ring 16 includes pins 52,54 extending radially from the ring 16. The ring 16 is pivotally mounted between the first and second arms 36,40 of the C-shaped member 14 by flexing the arms 36,40 away from each other to provide clearance for the placement of ring 16. The arms 36,40 are then released to mount the pins 52,54 within the apertures 48,50.

In using the cup holder 10, the planar member second end 20 is inserted into the open ash tray of an automobile. The ash tray A is then moved to the closed position to secure and support the planar member 12, as shown in FIG. 1. The cup holder 10 may also be secured in the glove compartment G of an automobile by first opening the glove compartment G and then closing the glove compartment door GD on the planar member to secure the cup holder 10. The cup holder 10 may also be secured in a conventional storage compartment located between the driver seat and the passenger seat (not shown). In such a case, the door of the storage compartment is closed on the planar member to secure the cup holder.

The stop ridges 28,30 limit the insertion of the planar member 12 into a compartment and thus ensure optimum placement. The stop ridges 26,28 also help secure the planar member 12 against dashboard D of the vehicle, acting as an upper and lower brace for the planar member 12. The gripping ridges 30,32 eliminate movement of the holder 10 once the planar member 12 has been secured in an ashtray or compartment. In addition, both the stop ridges 26,28 and the gripping ridges 30,32 provide additional rigidity to the planar member 12. A conical shaped cup or cup having a upper rim with a diameter greater than the ring member 16 may be placed and secured in the ring member 16 once the planar member 12 has been secured. The cup holder 10 is constructed of plastic or similar material.

An alternative configuration for the ring member 100 is shown in FIG. 6. The cup retaining ring 102 includes a first edge 104 facing a second edge 106 to define a gap in the ring 100. Integral to the ring 102 is a U-shaped member 108. The U-shaped member 108 has a first leg 110 extending downwardly from the first edge 104 and a second leg 112 extending downwardly from the second edge 106. The U-shaped portion 108 allows a cup with a handle to be retained in the ring 102 with the handle of the cup disposed in the gap and supported by said U-shaped member 108.

A cup holder 200 representing a second embodiment of the present invention is shown in FIG. 3. The planar member 212 of this embodiment includes a planar offset portion 220 connecting the planar member first end 218 and the planar member second end 220. The offset portion extends downwardly from the planar member first end 218 to the planar member second end 220, providing additional clearance for taller cups supported in the ring 216. The stop ridges 226,228, gripping ridges 230,232, C-shaped member 214, and cup retaining ring 216, are similar to the stop ridges 26,28, gripping ridges 30,32, C-shaped member 14, and cup retaining ring 16 respectively of the cup holder 10 of the first embodiment.

Figure 4:
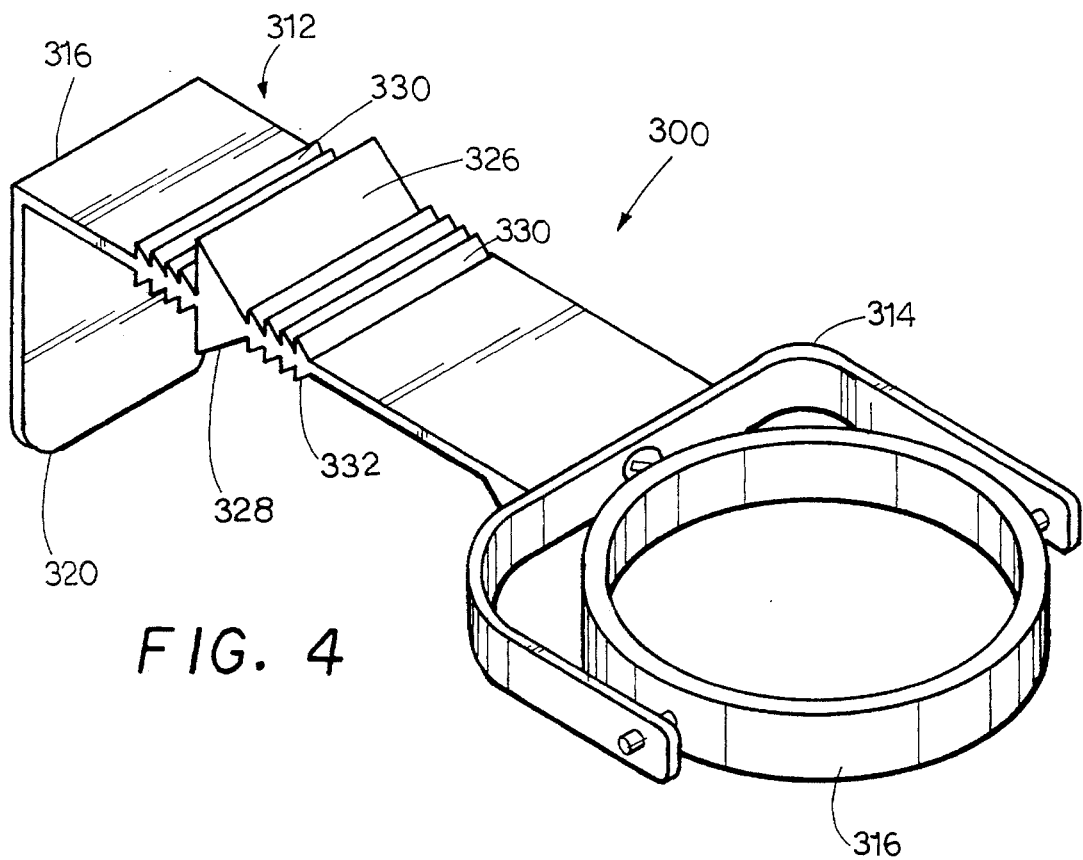
FIG. 4 is a perspective view of a third embodiment of the present invention which includes a window attachment portion.

A cup holder 300, representing a third embodiment of the present invention as shown in FIG. 4, is attachable to the door window of an automobile. The planar member 312 of this embodiment includes a window attachment portion 320. The window attachment portion 320 extends downwardly from the planar member second end 316 and is disposed in a plane perpendicular to the plane of the planar member 312. The window attachment portion 320 is secured within the window cavity of the car door between the window and the interior wall of the car (not shown). The stop ridges 326,328, gripping ridges 330,332, C-shaped member 314, and cup retaining ring 316, are similar to the stop ridges 26,28, gripping ridges 30,32, C-shaped member 14, and cup retaining ring 16 respectively of the cup holder 10 of the first embodiment.

Figure 5:
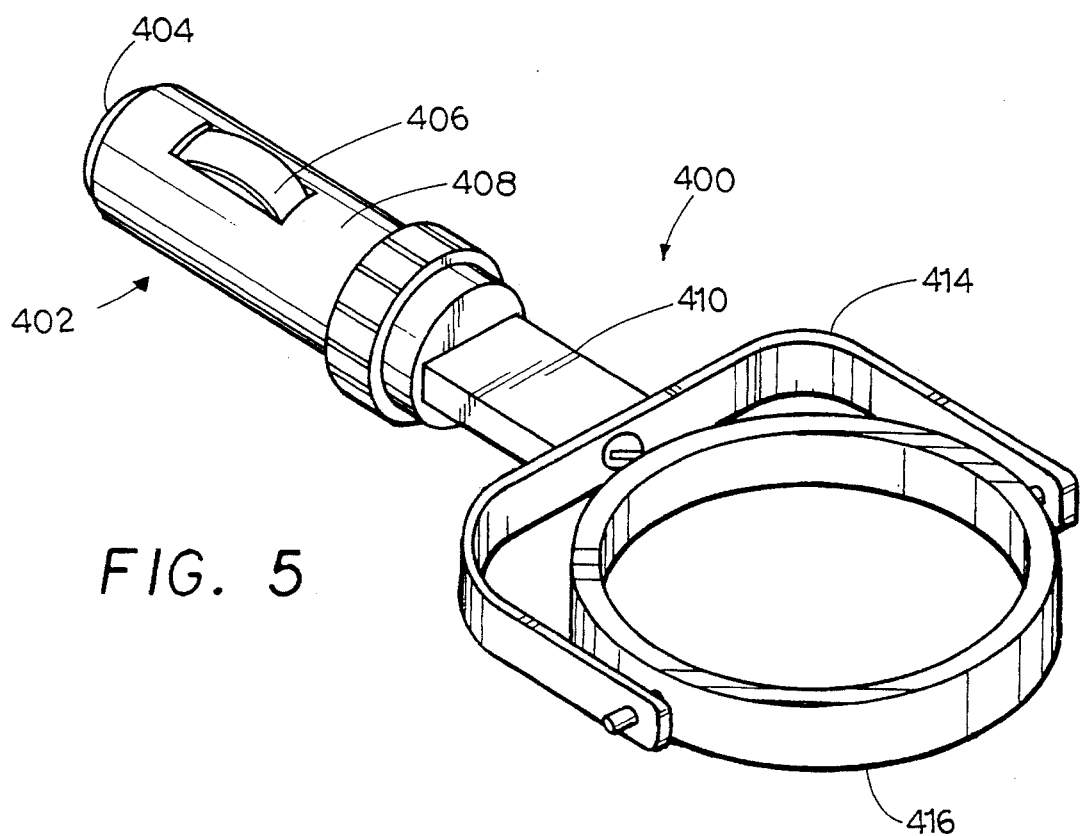
FIG. 5 is a perspective view of a fourth embodiment of the present invention used with an automobile cigarette lighter socket.

The cup holder 400 of a fourth embodiment of the present invention, as shown in FIG. 5., is used with an automobile cigarette lighter socket within a vehicular dashboard. This embodiment includes an elongated support cylinder 402 defined by an external predetermined configuration substantially equal to the predetermined internal configuration of the cigarette socket. The support cylinder first end 404 is inserted into the lighter socket. Two spring clip members 406, one of which is shown in FIG. 5 and the other of which is located directly opposite thereto, are located on the exterior surface 408 of the support cylinder 402. These spring clips members 406 secure the support cylinder 402 within the lighter socket. An elongated planar member 410 extends from the second end 412 of the support cylinder 402 and supports an arm member 414 and a ring member 416 in a manner similar to that described for the cup holder 10 of the first embodiment.

A cup holder 500, representing a fifth embodiment of the present invention is shown in FIG. 7, includes a pin 502 having a pin first end 504 and a pin second end 506. The pin 502 is inserted through an aperture 508 in support arm member 50 and then secured in an second aperture 512 in the end 514 of the planar member 56, allowing the support arm member 510 to rotate about a common longitudinal axis of the pin 502 and the planar member 516. The planar member 516 may be selectively configured similar to the planar member 12, 212, or 312 modified to include the aperture 522.

A spring 518 disposed around the pin 502 has a spring first end 520 secured in an aperture 522 in the end 514 of the planar member 56 and a spring second end 524 secured in an aperture 526 in the support arm member 510. The spring 518 biases the support arm member 510 from the a non-level position to a level position, maintaining the support arm 510 in the level position for convenient placement of a cup 528 in the holder.

The cup 528 provided with this embodiment includes a first pin 530 and a second pin 532. The pins 530,532 are mounted in the pin slots 534,536 of the first arm 538 and second arm 540 of the support arm member 510, allowing the cup 528 to pivot.

It is to be understood that the present invention is not limited to the embodiments described above, but encompasses any and all embodiments within the scope of the following claims.

What is claimed is:

1. A holder for holding a beverage container in a generally upright position when located within an automobile, said holder comprising:

an elongated planar member, said elongated planar member having a planar member first end, a planar member second end, a top surface, a bottom surface, a top stop ridge extending from said top surface between said planar member first end and said planar member second end, a bottom stop ridge extending from said bottom surface between said planar member first end and said planar member second end, a plurality of top gripping ridges extending from said top surface between said planar member first end and said planar member second end, and a plurality of bottom gripping ridges extending from said bottom surface between said planar member first end and said planar member second end;

a support arm member, said support arm member including a middle section, a first arm extending from a first end of said middle section to terminate in a first arm end, and a second arm extending from a second end of said middle section to terminate in a second arm end;

means for rotatably connecting said middle section of said support arm member to said planar member first end, whereby said middle section has a longitudinal axis substantially perpendicular to a longitudinal axis of said elongated planar member;

cup retaining means for supporting the beverage container; and means for pivotally mounting said cup retaining means between said first arm end and said second arm end.

2. The holder according to claim 1, wherein said elongated planar member has a rectangular cross-section, and said top stop ridge, said bottom stop ridge, said plurality of top gripping ridges, and said plurality of bottom gripping ridges all have triangular cross-sections.

3. The holder according to claim 1, wherein said elongated planar member includes a window attachment portion, said window attachment portion extending downwardly from said planar member second end and disposed in a plane perpendicular to the plane of the elongated planar member.

4. The holder according to claim 1, wherein said elongated planar member includes a planar offset portion connecting said planar member first end and said planar member second end, said offset portion extending downwardly from said planar member first end to said planar member second end, whereby said planar member first end is disposed in a plane above and parallel to a plane of the planar second member.

5. The holder according to claim 1, wherein said cup retaining means includes a cup retaining ring having a first edge, a second edge, said first edge facing said second edge to define a gap in said cup retaining ring, and a U-shaped member having a first leg and a second leg, said first leg integral to and extending downwardly from said first edge, said second leg integral to and extending downwardly from said second edge, whereby a cup having a handle may be retained in said cup retaining ring with the handle of the cup disposed within said gap and supported by said U-shaped member.

6. The holder according to claim 2 wherein, said cup retaining means includes a cup retaining ring, said support arm member comprises a resilient C-shaped member having a middle section, a first arm extending from a first end of said middle section to terminate in a first arm end, and a second arm extending from a second end of said middle section to terminate in a second arm end, said means for pivotally supporting said cup retaining means between said first arm end and said second arm end includes, a first aperture in said first arm end, a second aperture in said second arm end, a first pin extending radially from said cup retaining ring and mounted in said first aperture, a second pin opposite said first pin extending radially from said cup retaining ring and mounted in said second aperture, whereby said cup retaining ring may rotate along a common axis of said first pin, said second pin, said first aperture, and said second aperture.

7. The holder according to claim 1 wherein, said means for rotatably connecting said middle section of said support arm member to said planar member first end includes a pin having a pin first end and a pin second end, said pin first end attached to said planar member first end, and said pin second end rotatably attached to said middle section of said support arm member whereby said support arm member may rotate about a common longitudinal axis of said pin and said elongated planar member, a spring disposed around said pin, said spring having a spring first end and a spring second end, said spring first end secured to said planar member first end, said spring second end secured to said middle section of said support arm member, whereby said support arm member is biased from a non-level position to a level position, said cup retaining means for supporting the beverage container includes, a cup having a first cup pin extending outwardly from a first side of said cup and a second cup pin extending outwardly from a second side of said cup opposite said first side, said first cup pin and said second pin cup having a common longitudinal axis, and said means for pivotally mounting said cup retaining means between said first arm end and said second arm end includes, a first cup pin slot in said first arm end, said first cup pin slot dimensioned to accept said first cup pin, and a second cup pin slot in said second arm end, said second cup pin slot dimensioned to accept said second cup pin.

8. A holder for holding a beverage container in a generally upright position when located within an automobile, said holder comprising:

an elongated planar member, said elongated planar member having a planar member first end, a planar member second end, a top surface, a bottom surface, a top stop ridge extending from said top surface between said planar member first end and said planar member second end, a bottom stop ridge extending from said bottom surface between said planar member first end and said planar member second end, a plurality of top gripping ridges extending from said top surface between said planar member first end and said planar member second end, and a plurality of bottom gripping ridges extending from said bottom surface between said planar member first end and said planar member second end, said elongated planar member having a rectangular cross-section, and said top stop ridge, said bottom stop ridge, said plurality of top gripping ridges, and said plurality of bottom gripping ridges all having triangular cross-sections;

a resilient C-shaped support member having a middle section, a first arm extending from a first end of said middle section to terminate in a first arm end, and a second arm extending from a second end of said middle section to terminate in a second arm end, said middle section rotatably connected to said planar member first end, said middle section having a longitudinal axis substantially perpendicular to a longitudinal axis of said elongated planar member;

cup retaining ring for supporting the beverage container; and means for pivotally mounting said cup retaining ring between said first arm end and said second arm end, said means including a first aperture in said first arm end, a second aperture in said second arm end, a first pin extending radially from said cup retaining ring and mounted in said first aperture, a second pin opposite said first pin extending radially from said cup retaining ring and mounted in said second aperture, whereby said cup retaining ring may rotate along a common axis of said first pin, said second pin, said first aperture, and said second aperture.

* * * * *